United States Patent
Fadde et al.

(10) Patent No.: US 9,989,254 B2
(45) Date of Patent: Jun. 5, 2018

(54) COMBUSTOR LEAKAGE CONTROL SYSTEM

(71) Applicant: General Electric Company, Schenectady, NY (US)

(72) Inventors: Elizabeth Angelyn Fadde, Greenville, SC (US); Lucas John Stoia, Taylors, SC (US); Christopher Paul Willis, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 767 days.

(21) Appl. No.: 13/908,050

(22) Filed: Jun. 3, 2013

(65) Prior Publication Data

US 2014/0352316 A1 Dec. 4, 2014

(51) Int. Cl.
*F23R 3/60* (2006.01)
*F23R 3/00* (2006.01)
*F02C 7/264* (2006.01)
*F02C 7/266* (2006.01)

(52) U.S. Cl.
CPC .............. *F23R 3/002* (2013.01); *F02C 7/264* (2013.01); *F02C 7/266* (2013.01); *F23R 3/60* (2013.01); *F23R 2900/00012* (2013.01)

(58) Field of Classification Search
CPC .. F23R 3/002; F23R 3/60; F02C 7/264; F02C 7/266
See application file for complete search history.

(56) References Cited

U.S. PATENT DOCUMENTS

| | | | | |
|---|---|---|---|---|
| 2,971,340 A * | 2/1961 | Bullock | .................. | F02C 7/262 431/23 |
| 3,048,015 A * | 8/1962 | Barrelle | .................. | F02C 7/266 60/39.821 |
| 3,910,036 A * | 10/1975 | Irwin | ..................... | F23R 3/007 285/187 |
| 3,911,672 A * | 10/1975 | Irwin | ..................... | F02C 7/266 60/753 |
| 4,216,651 A * | 8/1980 | Ormerod | ................. | F02C 7/266 431/264 |
| 4,591,794 A | 5/1986 | Shattuck et al. | | |
| 4,622,821 A * | 11/1986 | Madden | .................. | F23R 3/002 60/755 |
| 5,297,187 A | 3/1994 | Sodergren et al. | | |
| 5,636,511 A * | 6/1997 | Pfefferle | ................... | F01N 3/18 431/268 |

(Continued)

OTHER PUBLICATIONS

U.S. Appl. No. 13/416,496, filed Mar. 9, 2012, Willis, et al.
U.S. Appl. No. 13/716,821, filed Dec. 12, 2012, Melton, et al.

*Primary Examiner* — Lorne Meade
*Assistant Examiner* — Eric Linderman
(74) *Attorney, Agent, or Firm* — Eversheds Sutherland (US) LLP

(57) ABSTRACT

The present application provides a combustor with a radial penetration. The combustor may include a combustion chamber, a liner surrounding the combustion chamber, a flow sleeve surrounding the liner, a penetration tube extending through the liner and the flow sleeve with the radial penetration positioned within the penetration tube, a flange extending from the penetration tube about the flow sleeve, and a ferrule positioned about the flange and the radial penetration so as to limit leakage about the radial penetration.

12 Claims, 2 Drawing Sheets

(56) References Cited

U.S. PATENT DOCUMENTS

| | | | |
|---|---|---|---|
| 6,367,262 B1* | 4/2002 | Mongia | F23R 3/14 60/748 |
| 6,438,940 B1* | 8/2002 | Vacek | F02C 7/266 60/204 |
| 6,557,350 B2* | 5/2003 | Farmer | F23R 3/283 60/39.821 |
| 6,920,762 B2* | 7/2005 | Wells | F02C 7/264 60/39.821 |
| 7,013,634 B2* | 3/2006 | Pidcock | F23R 3/002 60/39.821 |
| 7,101,173 B2* | 9/2006 | Hernandez | F02C 7/266 239/533.12 |
| 7,140,189 B2 | 11/2006 | Markarian et al. | |
| 8,171,719 B2* | 5/2012 | Ryan | F02C 7/264 60/39.821 |
| 8,407,892 B2 | 4/2013 | DiCintio et al. | |
| 8,479,490 B2* | 7/2013 | Zupanc | F02C 7/264 60/39.821 |
| 8,683,805 B2* | 4/2014 | Chen | F02C 7/22 60/740 |
| 8,726,631 B2* | 5/2014 | Rudrapatna | F02C 7/264 60/39.821 |
| 9,249,978 B2* | 2/2016 | Richardson | F23R 3/02 |
| 9,625,151 B2* | 4/2017 | Jause | F23R 3/06 |
| 9,784,186 B2* | 10/2017 | Bunel | F02C 7/20 |
| 2005/0028528 A1* | 2/2005 | Hernandez | F02C 7/266 60/752 |
| 2005/0072163 A1* | 4/2005 | Wells | F02C 7/264 60/796 |
| 2005/0086945 A1* | 4/2005 | Tiemann | F23M 5/04 60/800 |
| 2006/0016190 A1* | 1/2006 | Howell | F01D 25/12 60/752 |
| 2007/0051110 A1* | 3/2007 | Holland | F23R 3/06 60/776 |
| 2007/0068166 A1* | 3/2007 | Gautier | F02C 3/14 60/752 |
| 2009/0064657 A1* | 3/2009 | Zupanc | F02C 7/264 60/39.821 |
| 2009/0102346 A1 | 4/2009 | Fukuzawa et al. | |
| 2009/0151361 A1* | 6/2009 | Audin | F23R 3/002 60/796 |
| 2009/0178385 A1* | 7/2009 | Sandelis | F02C 7/266 60/39.821 |
| 2009/0199564 A1* | 8/2009 | Pieussergues | F02C 7/266 60/752 |
| 2009/0235635 A1* | 9/2009 | Ryan | F02C 7/264 60/39.821 |
| 2009/0293486 A1* | 12/2009 | Hanson | F23R 3/50 60/752 |
| 2010/0043448 A1* | 2/2010 | Lohmueller | F23R 3/04 60/796 |
| 2010/0212324 A1* | 8/2010 | Bronson | F02C 7/264 60/752 |
| 2011/0048020 A1* | 3/2011 | Mueller | F23R 3/00 60/725 |
| 2011/0083440 A1 | 4/2011 | Stoia | |
| 2011/0113747 A1* | 5/2011 | Lains | F02C 7/266 60/39.821 |
| 2011/0113748 A1* | 5/2011 | Lains | F02C 7/266 60/39.827 |
| 2011/0120132 A1* | 5/2011 | Rudrapatna | F02C 7/264 60/752 |
| 2012/0110975 A1* | 5/2012 | Alholm | F02C 7/266 60/39.821 |
| 2012/0227373 A1* | 9/2012 | Bunel | F02C 7/266 60/39.827 |
| 2012/0255275 A1* | 10/2012 | Bunel | F02C 7/266 60/39.827 |
| 2013/0031908 A1* | 2/2013 | DiCintio | F23R 3/06 60/752 |
| 2013/0067921 A1 | 3/2013 | Hadley et al. | |
| 2013/0195546 A1* | 8/2013 | Ponziani | F23R 3/60 403/327 |
| 2014/0000268 A1* | 1/2014 | Alholm | F02K 3/10 60/761 |
| 2014/0007580 A1* | 1/2014 | Richardson | F23R 3/02 60/754 |
| 2014/0083112 A1* | 3/2014 | Jause | F23R 3/002 60/782 |
| 2014/0137567 A1* | 5/2014 | Park | F02C 3/14 60/796 |
| 2014/0352275 A1* | 12/2014 | McCormick | F23R 3/002 60/39.821 |
| 2014/0352323 A1* | 12/2014 | Bennett | F02C 7/28 60/799 |
| 2015/0040575 A1* | 2/2015 | Martinez Fabre | F02C 7/264 60/776 |
| 2015/0147159 A1* | 5/2015 | Homeyer | F01D 25/26 415/118 |
| 2015/0211420 A1* | 7/2015 | Sze | F02C 7/266 60/776 |
| 2015/0354818 A1* | 12/2015 | Lebel | F23R 3/002 60/796 |
| 2016/0003150 A1* | 1/2016 | DiCintio | F02C 7/18 60/39.827 |
| 2016/0115874 A1* | 4/2016 | Bandaru | F28F 1/00 60/801 |
| 2016/0245517 A1* | 8/2016 | Sonntag | F23R 3/60 |
| 2016/0305325 A1* | 10/2016 | Cunha | F02C 7/266 |
| 2016/0334102 A1* | 11/2016 | Johnson | F23R 3/002 |
| 2016/0334103 A1* | 11/2016 | Eastwood | F23R 3/002 |
| 2016/0356223 A1* | 12/2016 | Huang | F02C 7/266 |
| 2017/0108225 A1* | 4/2017 | Bunel | F23R 3/60 |
| 2017/0167728 A1* | 6/2017 | Gonyou | F23R 3/002 |

* cited by examiner

COMBUSTOR LEAKAGE CONTROL SYSTEM

TECHNICAL FIELD

The present application and the resultant patent relate generally to gas turbine engines and more particularly relate to a gas turbine engine having a combustor with a leakage control system to prevent leakage about radial penetrations into the combustion zone.

BACKGROUND OF THE INVENTION

Generally described, a gas turbine engine includes a combustor to ignite a mixture of fuel and air so as to produce combustion gases to drive a turbine. The combustor may include a number of fuel nozzles and a pressurized combustion zone surrounded by a liner, a flow sleeve, and an outer casing. The liner and the flow sleeve may define a cooling flow path therebetween. During operation, high pressure air may be discharged from a compressor into the combustor. A portion of the air may be mixed with fuel and ignited within the combustion chamber as described above. A further portion of the air may be channeled through the flow path for cooling the liner and other components. This process may be repeated by any number of combustors positioned in a circumferential array.

One or more radial penetrations may pass through the outer casing, the flow sleeve, and the liner of each combustor so as to interact with the combustion gases within the combustion chamber. These radial penetrations may include an igniter, pressure probes, flame detectors, and other types of components. The radial penetrations generally may be accompanied by different types of hardware to prevent or limit leakage out of the pressurized combustion chamber. The profile of such hardware within the flow path, however, generally has been relatively large so as to accommodate thermal growth. Such a large profile may generate wakes in the flow of air that may cause a non-uniform distribution of the air to the fuel nozzles or other fuel mixing component. The non-uniform distribution of air may result in flame instabilities and other types of combustion issues that may have an impact on overall efficiency.

There is thus a desire for an improved leakage control system for radial penetrations in a combustor. Preferably such a leakage control system may accommodate different types of radial penetrations while limiting leakage and limiting the creation of a non-uniform distribution of air in the cooling flow path for more efficient overall operation.

SUMMARY OF THE INVENTION

The present application and the resultant patent thus provide a combustor with a radial penetration. The combustor may include a combustion chamber, a liner surrounding the combustion chamber, a flow sleeve surrounding the liner, a penetration tube extending through the liner and the flow sleeve with the radial penetration positioned within the penetration tube, a flange extending from the penetration tube about the flow sleeve, and a ferrule positioned about the flange and the radial penetration so as to limit leakage about the radial penetration.

The present application and the resultant patent further provide a method of limiting leakage from a combustion chamber about a radial penetration. The method may include the steps of positioning a penetration tube through a flow sleeve, a flow path, and a liner into the combustion chamber, attaching the penetration tube to the liner via a boss, attaching the penetration tube to the flow sleeve via a ferrule positioned outside of the flow path, and positioning the radial penetration through the penetration tube into the combustion chamber.

The present application and the resultant patent further provide a combustor with one or more radial penetration extending therethrough. The combustor may include a combustion chamber, a liner surrounding the combustion chamber, a flow sleeve surrounding the liner, a flow path between the liner and the flow sleeve, and a leakage control system extending through the liner, the flow path, and the flow sleeve. The leakage control system may include a penetration tube and a ferrule positioned outside of the flow path.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
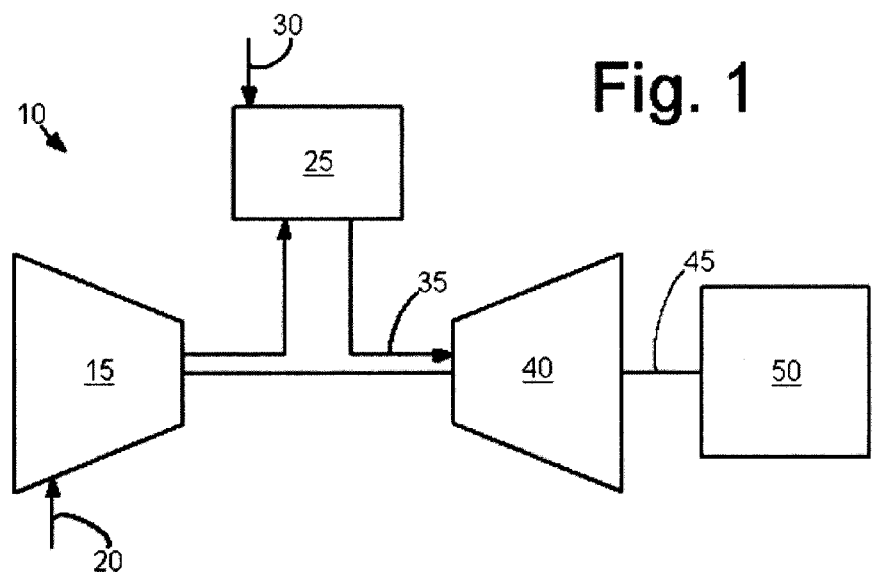
FIG. 1 is a schematic diagram of a gas turbine engine showing a compressor, a combustor, and a turbine.

Referring now to the drawings, in which like numerals refer to like elements throughout the several views, FIG. 1 shows a schematic view of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
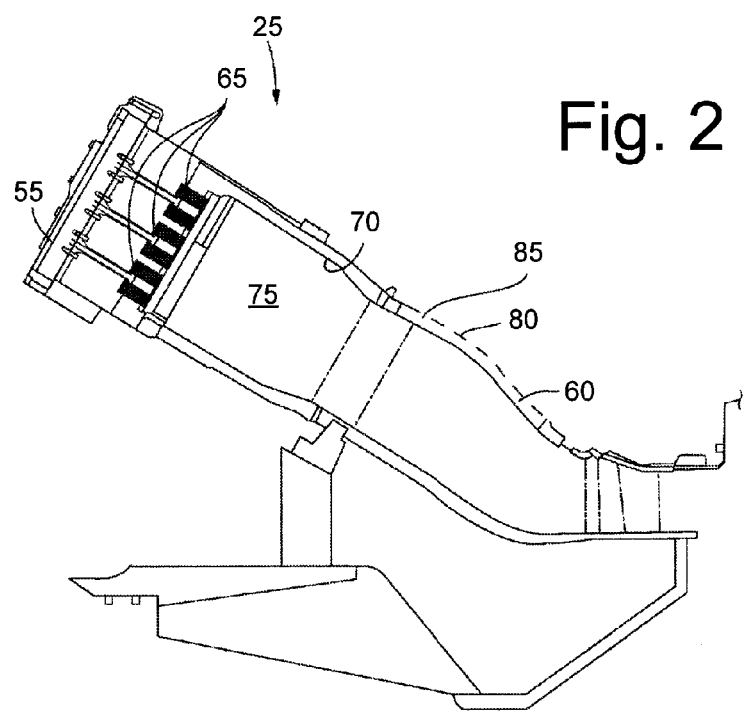
FIG. 2 is a schematic diagram of a combustor that may be used with the gas turbine engine of FIG. 1.

FIG. 2 shows a schematic diagram of an example of the combustor 25 that may be used with the gas turbine engine 10 described above and the like. Generally described, the combustor 25 may extend from an end cover 55 at a head end to a transition piece 60 at an aft end about the turbine 40. A number of fuel nozzles 65 may be positioned about the end cover 55. A liner 70 may extend from the fuel nozzles 65 towards the transition piece 60 and may define a pressurized combustion zone 75 therein. The liner 70 may be surrounded by a flow sleeve 80. The liner 70 and the flow sleeve 80 may define a flow path 85 therebetween for the flow of air 20 from the compressor 15 or from other sources. Any number of the combustors 25 may be used herein in a canannular array and the like. The combustor 25 described herein is for the purpose of example only. Combustors with other components and other configurations may be used herein.

Figure 3:
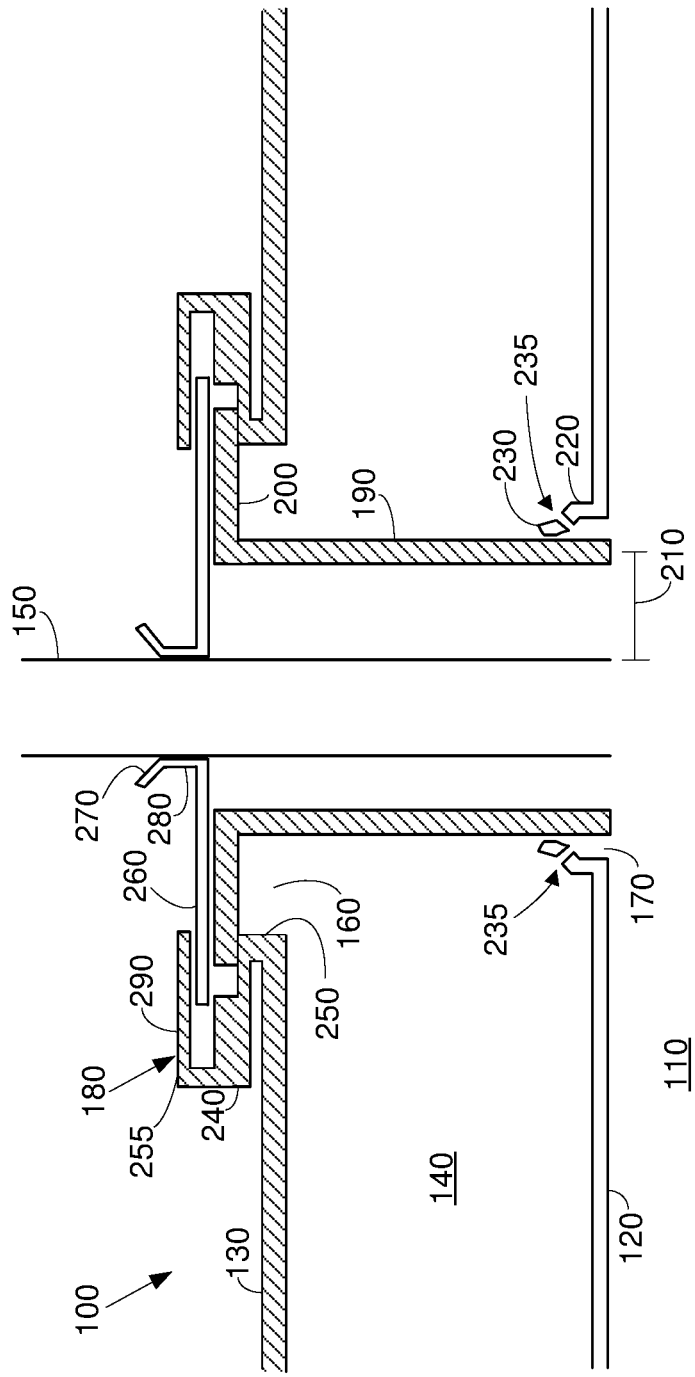
FIG. 3 is a schematic diagram of a portion of a combustor with a leakage control system for radial penetrations into the combustion chamber as may be described herein.

FIG. 3 shows an example of a portion of a combustor 100 as may be described herein. Generally described, the combustor 100 includes a pressurized combustion chamber 110. The pressurized combustion chamber 110 may be surrounded by a liner 120 and a flow sleeve 130. The liner 120 and the flow sleeve 130 may define a flow path 140 therethrough. The liner 120 also includes a transition piece as described above. An outer casing (not shown) also may be used. The combustor 100 and the components thereof may have any size, shape, or configuration. Any number of the combustors 100 may be used herein. Other components and other configurations may be used herein.

The combustor 100 may include a number of radial penetrations 150. As described above; the radial penetrations 150 may include igniters, pressure probes, flame detectors, and the like. Any type of radial penetration 150 may be used herein in any size, shape, or configuration. Different radial penetrations 150 may be used with different combustors 100. The radial penetration 150 may extend through a flow sleeve aperture 160 in the flow sleeve 130 and a liner aperture 170 in the liner 120 into the pressurized combustion chamber 110. Any number of the apertures 160, 170 may be used in any size, shape, or configuration and through any location about the combustor 100 and elsewhere.

Each of the radial penetrations 150 may be accompanied by a leakage control system 180. Generally described, the leakage control system 180 may include a penetration tube 190. The penetration tube 190 may be sized and shaped for the apertures 160, 170 and the radial penetration 150 as well as associated thermal expansion and contraction. The penetration tube 190 may be in the form of an airfoil, may have an elliptical shape, or have any other shape to reduce the impact of penetration. A number of penetration tubes 190 with differing sizes, shapes, and configurations may be used. The penetration tube 190 may include an upper flange 200 extending on one end for a substantial "top hat" like configuration. The radial penetration 150 may be positioned within the penetration tube 190 at an offset 210. The offset 210 may account for the thermal growth between the liner 120 and the flow sleeve 130 as well as a compressor discharge casing (not shown) and the like. The nature of the offset 210 may vary with the thermal cycle of the engine, differing growth during start-up/shut-down, the size of the radial penetration 150, the position of the radial penetration 150 along the combustion chamber 110, and other factors to improve the reduction in profile by biasing for difference in the overall thermal profile.

The leakage control system 180 may include a boss 220 positioned about the liner aperture 170 of the liner 120. The boss 220 may be welded to the liner 120 or otherwise attached. The boss 220 may have a slight neck 230 extending upwardly into the flow path 140. The boss 220 and the neck 230 may be sized and shaped to accommodate the penetration tube 190 extending therethrough in a substantially leak proof manner with a reduced profile within the flow path 140. The neck 230 may allow for purge from the flow path 140 to the outside for lifting purposes and the like. In some instances, the neck 230 may include one or more apertures 235 extending therethrough. Other components and other configurations may be used herein.

The leakage control system 180 also may include a flow sleeve insert 240. The flow sleeve insert 240 may be positioned about the flow sleeve aperture 160 of the flow sleeve 130 and outside of the flow path 140. The flow sleeve insert 240 may be welded to the flow sleeve 130 or otherwise attached. A portion of the flange 200 of the penetration tube 190 may sit about the insert 240 and may be allowed to move axially. An insert tab 255 and the like may be used to prevent rotation. The flow sleeve insert 240 may have any size, shape, or configuration.

The leakage control system 180 may include a ferrule 260 positioned about the flange 200 of the penetration tube 190 and the flow sleeve insert 240. The ferrule 260 may include a lead-in 270 to ease insulation of the radial penetration 150 and a ferrule tab 280 so as to prevent rotation. The ferrule 260 may have any size, shape, or configuration. The ferrule 260 may prevent leakage from the pressurized combustion chamber 110 about the radial penetration 150. A spring loaded cover 290 may be welded to the ferrule 260 and/or the flow sleeve insert 240 so as to prevent radial movement of the ferrule 260 and the penetration tube 190. The spring loaded cover 290 may have any size, shape, or configuration. Other components and other configurations may be used herein.

The leakage control system 180 thus prevents leakage around the radial penetrations 150 from the pressurized combustion chamber 110 to the flow path 140. This is accomplished via the multiple interfaces of the leakage control system 180 that may accommodate thermal growth between components while sealing air from the pressurized combustion chamber 180. Specifically, the penetration tube 190 allows for axial growth between the liner 120, the flow sleeve 130, and the outer casing. Likewise, the ferrule 260 "floats" so as to accommodate axial growth mismatches between the flow sleeve 130 and the outer casing. Similarly, the use of the offset 210 position within the penetration tube 190 may accommodate thermal growth between the liner 120 and the compressor discharge casing as determined through tolerance stacks. The flange 160 sits within the flow sleeve insert 250 and is allowed to move axially. The lead-in 270 and the ferrule 260 provide ease of insulation of the radial penetration 150.

Moreover, the penetration tube 190 may have a comparatively smaller profile so as to reduce the blockage of air within the flow path 140 such that any resulting wake may be smaller. The reduced profile may be gained through the use of the "top hat" shaped penetration tube 190 such that most of the components of the leakage control system 180 are positioned outside of the flow path 140. The reduced profile thus may the reduce blockage of the airflow therethrough by a multiple as compared to conventional devices, particularly in the context of late lean injection systems which add additional bluff bodies and associated wakes. The leakage control system 180 thus reduces non-uniformity of the airflow to the nozzles without taking an additional pressure drop normally associated therewith.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combustor with a radial penetration, comprising:
a combustion chamber;
a liner surrounding the combustion chamber;
a flow sleeve surrounding the liner;
a flow sleeve insert attached to the flow sleeve and comprising
a spring loaded cover portion;
a penetration tube extending through the liner and the flow sleeve, the penetration tube configured to move axially with respect to the flow sleeve insert;
wherein the radial penetration is positioned within the penetration tube;
a flange extending from an end of the penetration tube, wherein a portion of the flange is received in the spring loaded cover portion, and wherein the flow sleeve insert prevents the penetration tube from radial movement;
a floating ferrule positioned at the end of the flange and the radial penetration so as to limit leakage around the radial penetration, wherein the floating ferrule is in contact with the spring loaded cover portion, and the floating ferrule moves axially within the spring loaded cover portion; and
a boss positioned on the liner with the penetration tube extending therethrough, wherein the boss comprises a first portion extending from the liner parallel to the penetration tube followed by a neck portion angled towards a center line axis of the penetration tube, wherein the neck portion comprises at least one aperture therethrough.

2. The combustor of claim 1, further comprising a flow path between the liner and the flow sleeve.

3. The combustor of claim 1, wherein the liner comprises a liner aperture with the penetration tube extending therethrough.

4. The combustor of claim 1, wherein the flow sleeve comprises a flow sleeve aperture with the penetration tube extending therethrough.

5. The combustor of claim 1, wherein the radial penetration is positioned within the penetration tube at an offset.

6. The combustor of claim 1, wherein the flow sleeve insert comprises a tab thereon.

7. The combustor of claim 1, wherein the ferrule comprises a lead-in and a tab.

8. The combustor of claim 1, wherein the penetration tube and the floating ferrule comprise a leakage control system.

9. The combustor of claim 1, further comprising a plurality of radial penetrations.

10. A method of limiting leakage from a combustion chamber around a radial penetration, comprising:
positioning a penetration tube through a flow sleeve, a flow path, and a liner into the combustion chamber;
attaching a flow sleeve insert to the flow sleeve;
attaching the penetration tube to the liner via a boss, wherein the boss comprises a first portion extending from the liner parallel to the penetration tube followed by a neck portion angled towards a center line axis of the penetration tube, wherein the neck portion comprises at least one aperture therethrough;
attaching the penetration tube to the flow sleeve via a ferrule positioned outside of the flow path, wherein the penetration tube comprises a flange extending from an end of the penetration tube received within the flow sleeve insert, wherein the flange is configured to move in an axial direction;
preventing radial movement of the penetration tube and the ferrule with a spring loaded cover portion of the flow sleeve insert; and
positioning the radial penetration through the penetration tube into the combustion chamber.

11. A combustor with one or more radial penetrations extending therethrough, comprising:
a combustion chamber;
a liner surrounding the combustion chamber;
a flow sleeve surrounding the liner;
a flow sleeve insert attached to the flow sleeve and comprising a spring loaded cover portion;
the liner and the flow sleeve defining a flow path therebetween;
a leakage control system extending through the liner, the flow path, and the flow sleeve;
the leakage control system comprising a penetration tube configured to move axially with respect to the flow sleeve insert, a flange extending from an end of the penetration tube that is configured to move axially with respect to the flow sleeve insert, wherein a portion of the flange is received in the spring loaded cover portion, and wherein the flow sleeve insert prevents the penetration tube from radial movement, and a floating ferrule positioned at the end of the flange and outside of the flow path, wherein the floating ferrule is compressed by the spring loaded cover portion, and the floating ferrule moves axially within the spring loaded cover portion; and
a boss positioned on the liner with the penetration tube extending therethrough, wherein the boss comprises a first portion extending from the liner parallel to the penetration tube followed by a neck portion angled towards a center line axis of the penetration tube, wherein the neck portion comprises at least one aperture therethrough.

12. The combustor of claim 11, wherein the radial penetration is positioned within the penetration tube at an offset.

* * * * *